United States Patent [19]

Adler

[11] 4,133,323
[45] Jan. 9, 1979

[54] CONTROL TRIGGER GENERATING SYSTEM, PARTICULARLY TO GENERATE A TRIGGER SIGNAL USED IN INTERNAL COMBUSTION ENGINES, SUCH AS AN IGNITION OR FUEL INJECTION TRIGGER SIGNAL

[75] Inventor: Karl-Heinz Adler, Leonberg, Fed. Rep. of Germany

[73] Assignee: Robert Bosch GmbH, Stuttgart, Fed. Rep. of Germany

[21] Appl. No.: 825,094

[22] Filed: Aug. 16, 1977

[30] Foreign Application Priority Data

Sep. 10, 1976 [DE] Fed. Rep. of Germany ....... 2640791

[51] Int. Cl.² ............................................. F02Q 5/04
[52] U.S. Cl. ........................... 123/117 R; 123/32 EA; 235/92 MP
[58] Field of Search .......... 123/117 R, 148 E, 32 EA; 235/92 MP; 328/38; 340/347 P

[56] References Cited

U.S. PATENT DOCUMENTS

| 2,991,462 | 7/1961 | Hose | 235/92 MP |
| 3,411,102 | 11/1968 | Sommond et al. | 328/38 |
| 3,626,308 | 12/1971 | Paine | 328/38 |
| 3,652,832 | 3/1972 | Baumann | 235/92 MP |
| 3,815,560 | 6/1974 | Wahl et al. | 123/117 R |
| 3,874,351 | 4/1975 | Adler et al. | 123/117 R |
| 3,923,022 | 12/1975 | Scholl | 123/117 R |
| 3,990,412 | 11/1976 | Zeebnall et al. | 123/32 EA |
| 3,991,727 | 11/1976 | Kawai et al. | 123/32 EA |
| 4,015,566 | 4/1977 | Wahl | 123/117 R |

Primary Examiner—Charles J. Myhre
Assistant Examiner—R. A. Nelli
Attorney, Agent, or Firm—Flynn & Frishauf

[57] ABSTRACT

To simplify electronic fuel injection or ignition signal generation, a transducer is provided which is formed as a segmental element providing a first or starting pulse at a certain angular position of the crankshaft of the engine and a second or termination pulse when the crankshaft of the engine has moved through a predetermined angle. A frequency controllable oscillator, typically a voltage controlled oscillator (VCO) forming part of a phase locked loop (PLL) provides counting pulses to a first counter 12, the first counter counting from the start to a termination number and then providing the trigger signal. A second counter 13 is included in the PLL and counting pulses from the oscillator in the interval between the start and the termination signals, the count being compared with a number introduced in the PLL so that the frequency of the VCO will change with change of speed of the engine and the time when the first counter, as controlled by the frequency of the VCO, will have reached its predetermined count state will be controlled in dependence of the time interval during rotation of the shaft through the predetermined angle. A third counter 24 can be connected to the first counter 12 to introduce a number therein derived parameters of the engine, or in accordance with functional characteristics thereof to preset a number into the first counter 12 and thus modify the time of generation of the trigger pulse, the first counter then, preferably, being a reverse or down counter counting to 0 or null.

29 Claims, 3 Drawing Figures

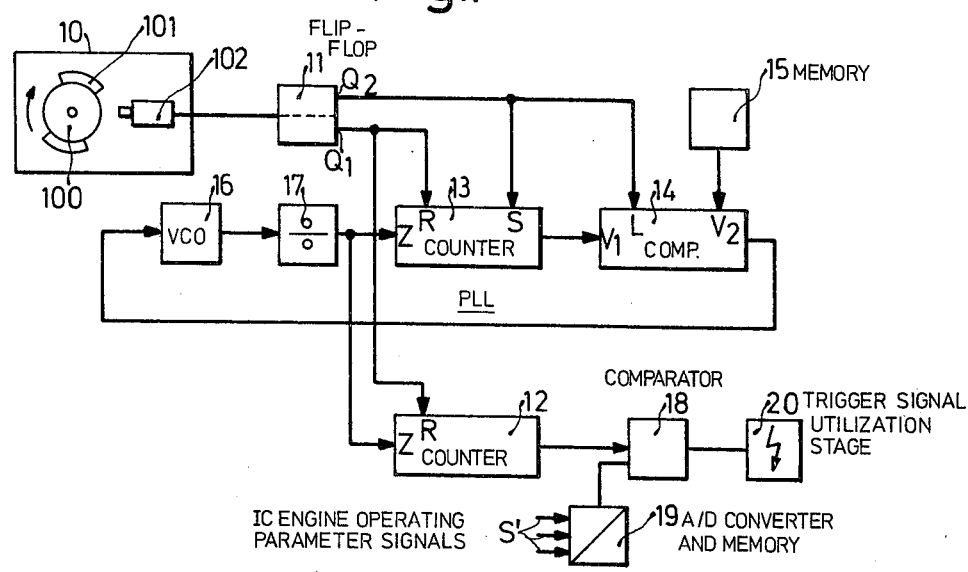
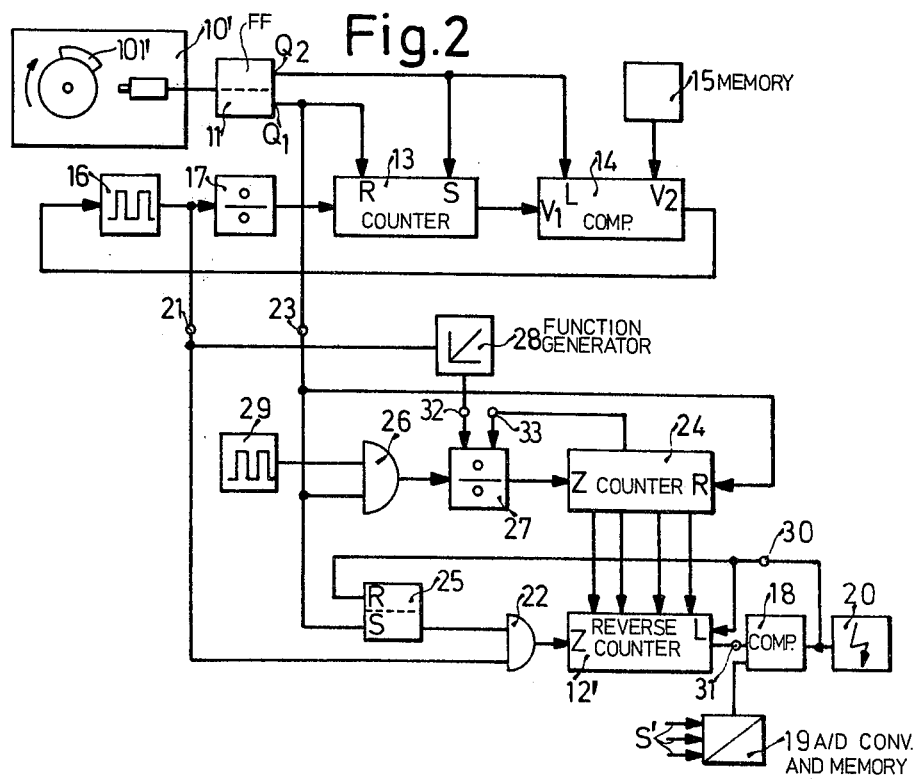

CONTROL TRIGGER GENERATING SYSTEM, PARTICULARLY TO GENERATE A TRIGGER SIGNAL USED IN INTERNAL COMBUSTION ENGINES, SUCH AS AN IGNITION OR FUEL INJECTION TRIGGER SIGNAL

REFERENCE TO RELATED PRIOR ART

German Published Application DT-AS No. 1,909,525 (U.S. Pat. No. 3,652,832); German Disclosure Document DT-OS No. 2,347,839 (U.S. Pat. No. 3,935,538); U.S. Pat. No. 3,881,458; U.S. Pat. No. 3,734,067.

The present invention relates to a system to generate a trigger pulse to trigger an event in dependence on angular position of a shaft, and more particularly to generate an ignition pulse, or a fuel injection pulse for use in an internal combustion engine (IC) which is accurately timed with respect to shaft position of the crankshaft of the engine.

BACKGROUND AND PRIOR ART

Various arrangements to generate trigger pulses, and particularly to generate ignition, or fuel injection control pulses have been proposed. One such arrangement is shown in German Patent Publication DT-AS No. 1,909,525. This arrangement, like various other ones, require a comparatively complex signal transducer apparatus. This signal transducer uses a first signal transducer assembly in which signals are continuously generated by rotating a toothed element, a star wheel, or the like in front of a stationary pickup and, additionally, a second assembly in which a reference marker located to provide a reference signal, determinative of a certain predetermined angular position of the crankshaft. Systems using such transducer arrangements are complex and not suited for mass production in the automotive field, they are expensive and the use of two transducer systems leads to greater susceptibility to trouble or malfunction in comparison to systems in which only a signal transducer is needed.

SUBJECT MATTER OF THE PRESENT INVENTION

It is an object of the present invention to simplify systems in which trigger signals are generated in dependence on rotation of a shaft through a predetermined angular segment which is simple, requires only a single transducer element and reliable while providing output signals which can be processed or modified in various ways.

Briefly, the transducer element provides only a start pulse and a termination pulse indicating when the shaft has reached a first predetermined angular position and after it has rotated through an angular segmented interval to reach a second predetermined angular position. In a typical form, such a disk may be a segmental element which is magnetically coupled to a stationary pickup. The output signals are processed by two counters, one of which is part of a phase locked loop (PLL) which also includes a frequency controllable oscillator, typically a voltage controlled oscillator (VCO). The PLL further includes a source of reference signals. The start signal from the transducer is introduced to a first counter which will count to a predetermined number the counter then providing an output trigger signal to trigger the desired event. The frequency of the VCO is controlled by the second counter which is part of the PLL, the count frequency of which is compared with a reference and nulled in the PLL, so that a frequency of the VCO will vary as the speed of the transducer disk varies and hence change the counting rate of the first counter.

In accordance with a feature of the invention, the generation of the trigger signal can easily be modified by introducing a count state or count number into the first counter, for example based on externally generated functions or numbers stored in a memory, such as a Read Only Memory (ROM), and additionally, comparisons of the output trigger signal generation can be effected in accordance with other data and, accordingly, modified. Such other data may, for example, include fixed operating data or variable data relating to operation of an automotive IC engine, such as temperature conditions, conditions of exhaust gases, whether the engine is under starting, or warm-up conditions, or the like.

The system requires only a single transducer which can be easily made and does not require accurate adjustment or correlation between two elements. The electronic circuit components are commercial articles, can be easily obtained in the form of integrated circuits, and are inexpensive. Overall integration of the entire system into a single integrated circuit is also possible, with adjustments for various engines and engine types being readily possible.

The modification in which a third counter is used is particularly important for automotive type IC engines in which the trigger pulse is used for ignition timing, since the ignition timing can be shifted in dependence on speed. The count input to the third counter is applied over a gate which, for example, is connected to a second oscillator, the gate being opened only during the time interval between the start and determination signal derived from the transducer segment. The count result of the third counter is then transferred to the first counter to provide a number from which, at the frequency of the VCO, the first counter will count down. At the end of the count from the first counter, the ignition signal, or other desired control signal will then issue. This arrangement is simple and permits matching of an ignition system of an IC engine to the specific ignition-speed and/or load characteristics of the IC engine which is desirable in most cases.

Drawings, illustrating an example:

FIG. 1 is a block diagram of the basic system in highly schematic form;

FIG. 2 is a block diagram of an expanded system in which additional operating parameters of the engine can be considered to change generation of an ignition pulse;

Figure 3:
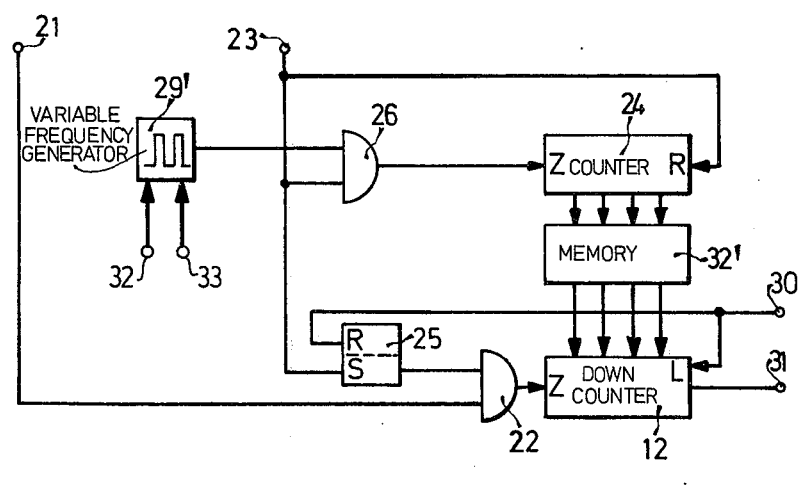
FIG. 3 is a fragmentary diagram of a portion of the diagram of FIG. 2 showing an alternative embodiment to obtain temporal shift of the trigger signal in accordance with engine operating parameters.

A transducer system 10 (FIG. 1) is coupled to a shaft 100, typically the crankshaft of an IC engine. The transducer system 10 includes a disk having segmental elements 101 located thereon which span a predetermined angular segment. A fixed pickup 102 is magnetically coupled to the segments 101. The transducer system 10 is connected to the input of a trigger or T-flip flip (FF) 11. The transducer 10 is shown as an inductive transducer, but it can equally be constructed as a breaker contact type transducer, as a Hall-type transducer, and optical transducer, or the like. Using a Hall-type transducer or a transducer, which is generating a similar signal proportional to the angle of the segmental element, the flip flop is not necessary. The important feature of the transducer is, however, to provide a signal which is related to a predetermined angle of rotation through which the shaft 100 turns. The segmental element 101 provides this shaft angle-signal relationship. The addition 101, of magnetically responsive material, is carried past the stationary pickup 102. A signal will be derived which is fixed with respect to the predetermined angle of rotation through which the shaft has turned, by generating at the beginning and at the end of passage of the segmental addition 101 a flux change and hence an electrical signal in the stationary pickup 102. Additional wave shaping and signal processing circuits—not shown in FIG. 1—may be used between the pickup 102 and the FF 11; such circuits may be trigger circuits, threshold circuits or the like.

FF 11 has two complementary outputs Q1 and Q2. The output Q1 of the FF is connected to the reset input R of a first counter 12 and also to the reset input R of a second counter 13. The complementary output Q2 of FF 11 is connected to a blocking or count termination input S of the second counter 13 and, additionally, to a command input L of a digital comparator 14. The two comparison inputs Z1 and Z2 of the comparator 14 are connected to the output of the second counter 13 and the output of a memory 15, respectively. The output of the digital comparator 14 is connected to the frequency control input of a frequency controllable oscillator 16. The oscillator 16 is a voltage controlled oscillator (VCO), with a circuit which converts the frequency derived from comparator 14 to a control voltage and then, in turn, controls the frequency of the VCO in dependence thereon. The output of VCO 16 is connected to a frequence divider circuit 17 which is connected to the count input Z of first counter 12 and of second counter 13. The components 13 to 17, together, form a phase locked loop (PLL). A typical VCO 16 which can be used in a PLL is a commercial article and obtainable as an integrated circuit RCA component CD4046. A complete disclosure of a digital PLL is described in German disclosure document DT-OS No. 2,437,839.

The output of the first counter 12 is connected to the input of a comparator 18. The second comparison input is connected to a memory 19 which, in the example shown, is an analog-digital converter. The analog inputs to the A/D converter 19 are voltages which are derived from sensors sensing operating parameters of the IC engine, the shaft 100 of which is connected to the transducer 10. Typical input parameters are engine temperature, ambient temperature, ambient air pressure, exhaust gas composition, starting conditions of the engine, warm-up condition of the engine, or the like. The output of comparator 18 will have the control signal appear thereat which is generated by the system in accordance with the present invention which, in the example illustrated, is applied to an electronic/electronic system 20 of any suitable, and well known design. Of course, the trigger signal can also be used to control other events, for example a fuel injection event and, therefore, element 20 is to be considered as a trigger signal utilization device which responds to a trigger signal derived from the system 10-19.

Operation: The signal wave shape derived from transducer 10 is shown above the transducer. When the first, or start signal is sensed, the Q1 of FF 11 will reset both counters 12 and 13. The complementary output Q2 of FF 11 opens the command input S of counter 13 and the signals from VCO 16 are counted into the two counters 12, 13, as a frequency divided in the divider stage 17. The counter 13 counts until the second or determination signal from transducer 10 changes FF 11, so that the command input terminal S will no longer have count pulses applied to the second counter 13. Simultaneously, FF 11 commands comparator 13 to compare the numbers inserted into the comparator through the two inputs Z1 and Z2. If the two numerical values are identical, then VCO 16 retains its frequency. Upon non-identity, however, the frequency of VCO 16 is so adjusted that the count state of counter will become identical to the numbers stored in memory 15. This digital operation is also described in the above referred to German disclosure document DT-OS No. 2,347,839. Counter 13 thus will always have the same count state, and the frequency of the VCO 16 will change with the speed of the transducer disk 101, and hence with speed of the shaft 100.

The frequency of VCO 16 thus is dependent on engine speed. It is counted in first counter 12 after having been frequency divided in the frequency divider 17. When the counter 12 reaches a count state which corresponds to the value stored in memory 19, or applied to the element 19 if, as shown, it is a A/D converter having parameter signals S' applied thereto, then comparator 18 will provide the control trigger output signal which, as above referred to, may be used to trigger certain desired events, for example to start an ignition event, a fuel injection event, or the like.

The frequency divider 17 is not strictly necessary; it is provided, however, in order to permit operation of the VCO 16 at a higher rate and thus permit operation of the PLL within ranges which can be easily processed from an engineering point of view.

An equivalent solution is obtained if the comparator 18 is omitted and the first counter 12 counts to a fixed count state, for example if counter 12 is constructed as a backward counter counting to 0. The memory 19 then should be connected to parallel inputs of the counter 12 and the signal of FF 11, which was used to reset counter 12, will be used as a transfer signal to transfer the value set within memory 19 into the counter 12. This number, then set into the counter is counted down at the rate determined by VCO 16. When the counter has reached zero or null, the trigger signal to utilization device 20 will be provided.

Embodiment of FIG. 2: basically, the system is similar to that of FIG. 1 and similar components have been given the same, or primed reference numerals and will not be explained again. The embodiment of FIG. 2 provides for additional arrangement to shift the generation of the trigger signal in accordance with a characteristic curve which, for example, may be the engine speed—ignition advance characteristic. Such characteristic curves are provided for most IC engines. In most automotive type IC engines, change of speed resulting in change of ignition can be electronically obtained. The output VCO 16 is connected over terminal 21 to one input of an AND gate 20 and additionally to the count input Z of counter 12'. Counter 12', in this embodiment, is a reverse or down counter. The output Q1 of FF 11 is connected through terminal 23 to the reset input R of a third counter 24 and to the set input of an FF 25. It is additionally connected an enabling input of an AND gate 26. The output of AND gate 26 is connected to a frequency divider stage 27 which has a controllable frequency division ratio. The control of frequency division ratio of the frequency divider stage 27 can be change by externally applied signals which are derived from inputs connected to terminals 32, 33. A controllable frequency divider stage 27 is commercially obtainable, for example integrated circuit HEF4018P-(VALVO). The terminal 21 is additionally connected to a function generator 28, the output of which is connected to terminal 32 and then to a control input of the frequency divider 27. The second control input 33 of the frequency divider stage 27 is connected with a numerical output of the counter 24. An oscillator 29 which, in one example may be a fixed frequency oscillator and in another a frequency controlled oscillator is connected to the other input of AND gate 26 which is enabled to pass the output from generator 29 when the other input, connected to FF 11 through terminal 23 is enabled. The output FF 25 is connected to the enabling input of the AND gate 22. The junction between comparator 18 and the electronic utilization device 20 is connected to a terminal 30 which, in turn, is connected to a terminal 30 which, in turn, is connected the reset input of the FF 25 and to the reading input L of counter 12. Count number or stage outputs of a counter 24 are connected to similar count number inputs of the counter 12; the connection may, however, also include inherent coding. The reverse the counter 12' is connected to the comparator 18' through terminal 31.

Operation: transducer 10' provides only one pair of start and termination signals for each revolution of the crankshaft of the engine, and has only one segment 101'; either transducer can be used with either system. The signal from transducer 10' which is available at the output Q1 of FF 11 opens gate 26 for the duration of the interval between the start and termination signals, so that pulses from the oscillator 29 can be passed therethrough. In accordance with the present embodiment, the frequency of oscillator 29 is a constant, or fixed frequency. The pulses, as divided in controllable divider stage 27 are counted in the third counter 24 during the time that the gate 26 is open. At the beginning of the count, the counter 24 has been reset by the signal applied from terminal 23 to the reset input of counter 24.

In a preceding cycle, a control signal available at the output of comparator 18 has blocked AND gate 22 through control of the reset input of FF 25. Simultaneously, the output count of the counter 24 was transferred into the first counter 12'. In the next subsequent cycle, that is, with the arrival of the signal at the output Q1 of FF 11, gate 26 will open—as described above—and, additionally, AND gate 22 will open by setting of the FF 25. Consequently, the signals from VCO 16 of the PLL will count down from the count state which has been transferred from the third counter 24 into the first counter 12'. This down counting process continues until the value within the down counter, or reverse counter 12' has reached a value in the A/D converter and memory 19. The comparator 18 will then provide the trigger signal, for example an ignition signal. This trigger signal not only provides the signal for the utilization stage 20, as described above, but will, additionally and also described above, reset FF 25 and hence block AND gate 22.

The elements 18, 19 are not strictly necessary; the trigger signals can also be generated, for example, when the counter 12' has reached a predetermined count state, for example, zero.

The trigger signal is modified by the operating characteristics of the engine by changing the frequency division ratio of frequency divider stage 27. Control signals for the frequency divider stage can be derived by the count state of the third counter 24 and/or from the frequency of the VCO 16. This frequency of VCO 16 is transferred to function generator 28 in which a control signal for the frequency divider stage 27 is obtained. The function generator 28, in the simplest form, may be a frequency-analog converter. An analog output signal, representative of change of frequency of VCO 16 is then used for connection to terminal 32 and hence to control the division ratio of the frequency divider 27. The stage 28, thus, operates as a frequency-analog function generator. As an alternative, the frequency divider stage 27 can be omitted and the oscillator 29 constructed as a VCO, having a control input which changes its frequency in accordance with the output of the function generator 28; additionally, or alternatively, the frequency of such a VCO can be additionally by the count which the counter 24 reaches, by connection of counter 24 to the VCO 29, preferably with interposition of a D/A converter, or constructing the VCO 16 to be digitally responsive as well, for example by summing binary digits across a capacitor.

Embodiment of FIG. 3: the embodiment of FIG. 3 is identical to that of FIG. 2 except that the elements connected to terminal 21, 23, 30, 31, 32, 33 are differently constructed and arranged. The frequency divider 27 and function generator 28 are not used. The output of the AND gate 26 is directly connected to the count input Z of the third counter 24. A Read Only Memory (ROM) 32' is connected between the output of third counter 24 and the count number input of counter 12'. The ROM contains, at discrete addresses, an output numerical value which is associated with any one number of the third counter 24, and which is transferred to the first counter 12' when the signal from terminal 30 energizes the read input L of counter 12'. If the adjustment characteristic always has a positive slope, then any one numerical value of the counter 24 has an unambiguous association with a stored value in ROM 32, and the output from ROM 32 can be transferred under command of the addressing by the counter 24. Thus, decoding of the output from counter 24 is not needed and a decoder can be saved. The output of counter 24 can then be used directly as an address for the ROM 32. The accuracy or closeness of matching of the characteristic to actual conditions can be selected suitably by providing a ROM of suitable storage capacity. If additional control is desired, then the frequency generator 29' can be a variable frequency generator and a function generator 28 additionally be used, and terminals, 32, 33 connected to the varial frequency generator. The function generator 28 can then also be used to process signals S', or fixed signals from memory 32 can be introduced into the first counter 12' if the memory 32 is constructed as a programmable ROM (PROM), with a programmed input being controlled by a signal S'.

Various changes and modifications may be made, and features described in connection with any one of the embodiments may be used with any one of the others, within the scope of the inventive concept.

The system is particularly adapted to construction as an integrated circuit, or to be assembled by use of standard integrated circuits. For example, the following elements are suitable.

VCO 16, 29':RCA CD4046

The base frequency of the PLL, for a four cylinder engine operating at 3000 rpm is, for example 18khz Counters 12, 12', 13, 24: Signetics 54/74290
Digital comparator 14, 18: Signetics 9324
Memory 15: Signetics 7488
Utilization stage 20, if an ignition system: U.S. Pat. No. 3,881,458
Utilization stage 20, if a fuel injection system: U.S. Pat. No. 3,734,067
Controllable function generator 27: HEF4018P (VALVO)

I claim:

1. Controlled trigger signal generating system to provide a trigger signal to trigger an event in dependence on rotation of the shaft (100) of an engine, particularly for generation of a trigger signal used in internal combustion engines to trigger an ignition or fuel injection event in dependence on rotation of the crankshaft of the engine, comprising
 a first counter (12, 12') counting to a first predetermined count state;
 a frequency controllable oscillator (16) generating pulses and connected to the first counter (12, 12'), so that said first counter will count pulses from the oscillator to said first predetermined count state;
 signal generator means (10) coupled to the shaft (100) of the engine and providing
 (a) a count start signal, and
 (b) an angular shaft rotation termination signal, representative of rotation of the shaft (10) through a predetermined angle after generation of the count start signal,
 said count start signal being connected to said first counter (12) to cause said first counter to commence counting;
 means (18, 20) connected to said first counter (12, 12') and providing said trigger signal when the counter has reached said first predetermined count state;
 a second counter (13) connected to said frequency controllable oscillator (16) so that said second counter will count pulses from the oscillator (16) said count start signal being connected to the second counter to cause the second counter to count, and said termination signal being connected to said second counter to control the second counter to stop counting, to control the count duration of said second counter by said angular shaft rotation signals so that the counter will count during the interval when the shaft (10) turns through said predetermined angle;
 and a phase locked loop circuit, of which said frequency controllable oscillator (16) and said second counter (13) are parts, so that the time when said first counter (12, 12') will have reached said predetermined count state will be controlled in dependence on the frequency of the controllable oscillator (16) and hence the time interval during rotation of the shaft through said predetermined angle.

2. System according the claim 1, wherein the phase locked loop includes a source of reference numbers (15);
 said frequency controllable oscillator (16), said second counter (13) and a comparator (15), the comparator being connected to compare the reference number from said source (15) and the count state of the second counter (13), said comparator (14) providing an output signal when a predetermined comparison relationship exists, said output signal being connected to control the frequency of the frequency controllable oscialltor (16) so that said oscillator (16), said second counter (13) said reference number source (15) and said comparator (14) will, together, form a closed phase locked loop.

3. System according to claim 2, wherein the frequency controllable oscillator is a voltage controlled oscillator (VCO) (16).

4. System according to claim 2, wherein the signal generator means (10) includes a segmental element (101, 101') extending over a predetermined circumferential angle of the shaft (100), coupled to the shaft and rotating therewith;
 and a fixed pickup (102) coupled to the segmental element to provide said count start signal and said termination signal, the interval between said signals being determined by the time duration of the rotation of the shaft through said predetermined angle.

5. System according to claim 2, wherein the frequency controllable oscillator is a voltage controlled oscillator (16), and the phase locked loop further comprises a frequency divider stage (17) connected to the output of the voltage controlled oscillator (16) to divide the output frequency thereof.

6. System according to claim 1, wherein the trigger signal generation means (18, 20) connected to the first counter (12, 12') includes a comparator (18) and means (19) entering a number into said comparator (18), said first predetermined count state being controlled by the number entered into said comparator, the trigger signal being generated when the number in the comparator and the count state of said first counter have a predetermined relationship.

7. System according to claim 1, wherein (FIG. 2, 3) the first counter (12') is a reverse, or countdown counter;
 and means (19; 24, 32) are provided entering a number into said down, or reverse counter (12') to cause said counter to count downwardly, or reversely until said first predetermined count state is reached.

8. System according to claim 6, wherein said means entering a number into the comparator comprises means providing a number representative of a fixed value.

9. System according to claim 7, wherein said means providing a number to the down counter comprises means providing a fixed value.

10. System according to claim 6, wherein said means providing said number to the comparator comprises means (19) providing a number controlled by an external parameter.

11. System according to claim 10, wherein said means providing said number comprises a storage means providing said number in dependence on an externally controlled parameter.

12. System according to claim 7, wherein said means providing said number to the comparator comprises means (19) providing a number controlled by an external parameter.

13. System according to claim 12, wherein said means providing said number comprises a storage means providing said number in dependence on an externally controlled parameter.

14. System according to claim 1, further comprising means (19; 24, 31) connected to said first counter (12, 12') to modify the stages through which said first counter counts said count stage modifying means (19; 24, 32) including storage means controlling modification of the counts through said count stages in accordance with an external parameter.

15. System according to claim 14, wherein said count stage modifying means comprises a third counter (24), and means (26, 29) controlling the count of said third counter in dependence on external operating parameters.

16. System according to claim 15, wherein the count state controlling means of said third counter (26, 29) comprises a second oscillator (29) and a gate (26), the gate being connected to and controlled by said signal generating means to pass signals from said oscillator (29) in the interval between said start signal and said termination signal, whereby the third counter will count a number of representative of speed of the engine.

17. System according to claim 16, further comprising a frequency divider stage (17) connected between the second oscillator (29) and the third counter.

18. System according to claim 17, wherein the frequency divider stage (27) is a controllable frequency divider stage, the frequency division ratio of said controllable frequency divider being controlled by the frequency of said first frequency controllable oscillator (16).

19. System according to claim 17, wherein the frequency divider stage (27) is a controllable frequency divider stage, and the frequency division ratio of said frequency divider stage is controlled by the count state of the third counter (24).

20. System according to claim 16, wherein said second oscillator (29) is a variable frequency oscillator, a frequency of said second oscillator being controlled by the frequency of said first frequency controllable oscillator (16).

21. System according to claim 16, wherein the second oscillator is a variable frequency oscillator (29), the frequency of oscillations of the second oscillator (29) being controlled by the count state of said third counter (24).

22. System according to claim 21, wherein the frequency of the second oscillator is controlled by the final count state of the third counter (24) during a counting cycle of the third counter (24).

23. System according to claim 16, further including a Read-Only Memory (ROM) (32) connected between the third counter (24) and the first counter (12), the storage positions of said ROM (32) being addressable by the output from said third counter (24).

24. System according to claim 1, wherein said at first predetermined count state of the first counter (12, 12') is adjustable.

25. System according to claim 24, further comprising a number generator (19; 24; 32) controlled by operating parameters of the engine, said number generator providing a count number the value of which is controlled by said parameters and applied to the first counter and forming said first predetermined count to, or from which said first counter will count.

26. Automotive system
comprising the control signal generating system of claim 1
wherein said means connected to said first counter and providing said trigger signal includes a trigger signal utilization stage (20) connected to the ignition system of the engine.

27. System according to claim 26, further comprising a number generator (19; 24; 32) controlled by operating parameters of the engine, said number generator providing a count number the value of which is controlled by said parameters and applied to the first counter and forming said first predetermined count to, or from which said first counter will count.

28. Automotive fuel injection system
comprising the control signal generating system of claim 1
and wherein the means connected to the first counter includes a trigger utilization stage (20) connected to a fuel injection system to inject fuel to the engine.

29. System according to claim 28, further comprising a number generator (19; 24; 32) controlled by operating parameters of the engine, said number generator providing a count number the value of which is controlled by said parameters and applied to the first counter and forming said first predetermined count to, or from which said first counter will count.

* * * * *